United States Patent
Harvey et al.

(10) Patent No.: US 11,926,735 B1
(45) Date of Patent: Mar. 12, 2024

(54) HIGH PERFORMANCE RESVERATROL CYANATE ESTER FORMULATIONS

(71) Applicant: The United States of America, as represented by the Secretary of the Navy, Arlington, VA (US)

(72) Inventors: Benjamin G. Harvey, Ridgecrest, CA (US); Michael D. Garrison, Ridgecrest, CA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 261 days.

(21) Appl. No.: 17/523,433

(22) Filed: Nov. 10, 2021

(51) Int. Cl.
| | |
|---|---|
| *C08G 73/06* | (2006.01) |
| *C08G 8/28* | (2006.01) |
| *C08J 5/24* | (2006.01) |
| *C08L 79/04* | (2006.01) |

(52) U.S. Cl.
CPC ............... *C08L 79/04* (2013.01); *C08G 8/28* (2013.01); *C08G 73/06* (2013.01); *C08G 73/0644* (2013.01); *C08G 73/065* (2013.01); *C08J 5/24* (2013.01); *C08J 2361/06* (2013.01); *C08J 2379/04* (2013.01); *C08L 2201/02* (2013.01); *C08L 2205/025* (2013.01)

(58) Field of Classification Search
None
See application file for complete search history.

(56) References Cited

U.S. PATENT DOCUMENTS

| | | | | |
|---|---|---|---|---|
| 7,030,204 | B2* | 4/2006 | Gmur | .................... C07C 261/02 |
| | | | | 524/871 |
| 8,853,343 | B1 | 10/2014 | Davis et al. | |
| 9,669,599 | B1* | 6/2017 | Tsang | ........................ B32B 5/26 |
| 10,723,834 | B1 | 7/2020 | Davis | |
| 2015/0357086 | A1* | 12/2015 | Boden | .................... H01B 7/421 |
| | | | | 252/75 |

OTHER PUBLICATIONS

Garrison, Michael D.; Harvey, Benjamin G. Polymer, vol. 213, Jan. 20, 2021, 123194.

* cited by examiner

*Primary Examiner* — David J Buttner
(74) *Attorney, Agent, or Firm* — Naval Air Warfare Center; Edu Enin-Okut

(57) ABSTRACT

The invention relates to cyanate ester resin blends containing resveratrol-based cyanate esters. At room temperature, the cyanate ester resin blend offers improved processability by remaining a liquid or forming a solid that melts at less than 70° C. The cyanate ester resin blend includes a resveratrol-based cyanate ester and a flexible cyanate ester having a configuration different than that of the resveratrol-based cyanate ester, where the resveratrol-based cyanate ester is no more than 80% of the total mass of the cyanate esters in the cyanate ester resin blend. A composite product can include the cyanate ester resin blend and a support material. When making the composite product, the support material is combined with the cyanate resin blend and cured at temperatures ranging from about 100° C. to about 300° C.

18 Claims, 4 Drawing Sheets

HIGH PERFORMANCE RESVERATROL CYANATE ESTER FORMULATIONS

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF INVENTION

The invention is related to a cyanate ester resin blend and a composite product including the same.

BACKGROUND

Conventional cyanate ester resins are used for high performance applications in the aerospace, automotive, electronics, and defense industries due to their high glass transition temperatures, low flammability, low dielectric constant, and low moisture uptake. Cyanate esters based on resveratrol and resveratrol derivatives have shown increased flame resistance over conventional cyanate ester resins as well as other thermoset families such as epoxies and bismaleimides (BMI). Despite these superior properties, resveratrol-based cyanate esters present processing challenges because these resins are solids at room temperature and readily recrystallize upon cooling below their melting points which range from about 75° C. to 170° C.

SUMMARY

The high performance cyanate ester resin blends containing resveratrol-based cyanate esters and more flexible conventional cyanate esters described herein exhibit improved processability by remaining a liquid at room temperature, or forming a solid with a melting temperature of 70° C. or less, while maintaining the high thermal stability derived from the parent resveratrol-based monomers. Increasing the concentration of resveratrol-based cyanate esters in the blends raises the glass transition temperatures, and increases both the decomposition temperatures and char yields of the blends, as compared to conventional cyanate esters. Blending also allows for a higher degree of cure than that generally achieved in planar tricyanate esters like trans-resveratrol tricyanate (ResCy) and cis-resveratrol tricyanate (cis-ResCy), which improves the long-term stability and material properties of composite products including the resveratrol-based resin blends.

DETAILED DESCRIPTION

Figure 1:
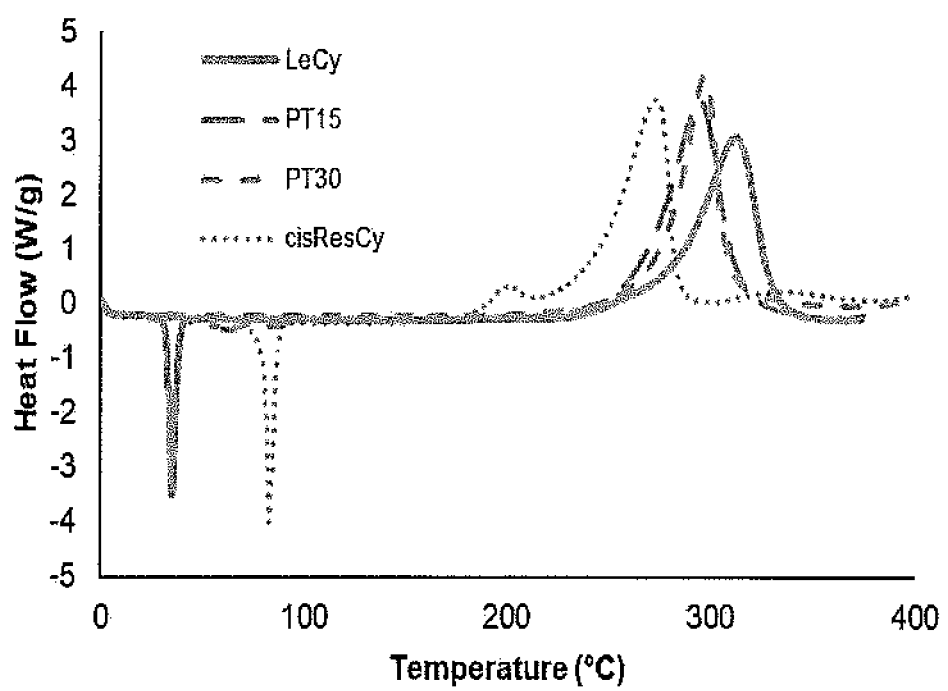
FIG. 1 is a graph showing differential scanning calorimetry (DSC) data for the cyanate ester monomers: LeCy. PT-15, PT-30, and cis-ResCy.

In the aerospace, automotive, and electronic industries, polymer matrix composites (PMCs) are widely employed as an alternative to metals or metal alloys to fabricate components. PMCs exhibit a number of advantages over conventional metals and metal alloys, including high strength-to-weight ratio, fatigue resistance, corrosion resistance, low dielectric constant, and low coefficient of thermal expansion. However, the composition of PMCs, in particular the polymer matrix material, can limit their use in high temperature applications due to the flammability of organic components.

The majority of conventional polymers used to address the flammability concerns of polymer matrix materials are derived from petroleum-based precursors, which exhibit long-term sustainability concerns. As a result, polymers and polymer precursors derived from biomass sources or generated via fermentation have been explored as alternatives to petroleum-based compounds, including cyanate ester resins derived from a bio-based phenol like resveratrol.

The cyanate ester resin blends described herein are formulated by combining a resveratrol-based cyanate ester and a flexible cyanate ester having a configuration different than that of the resveratrol-based cyanate ester. By "flexible" herein, with reference to a cyanate ester, it is meant that the unblended cyanate ester can reach greater than 70% h of its theoretical cross-link density. The presence of the flexible cyanate ester either completely prevents, or significantly suppresses, recrystallization of the resveratrol-based cyanate ester; thereby, producing a cyanate ester resin blend with the ability to remain liquid at room temperature either as a true liquid formulation or as a super-cooled liquid. This greatly improves the blend's processability, especially with respect to composite fabrication.

The resveratrol-based cyanate ester used in formulating the cyanate ester resin blend is at least one of a trans-resveratrol tricyanate ester (trans-ResCy), a cis-resveratrol tricyanate ester (cis-ResCy), and a dihydroresveratrol tricyanate (H2ResCy) described in U.S. Pat. Nos. 8,853,343 and 10,723,834, incorporated herein by reference. Among the above-mentioned resveratrol-based cyanate ester resins, cis-ResCy is preferred.

The flexible cyanate ester having a configuration different than that of the resveratrol-based cyanate ester, which can be used in formulating the cyanate ester resin blend, includes at least one of a bisphenol-based cyanate ester and a novolac-based cyanate ester. The bisphenol-based cyanate ester and the novolac-based cyanate ester useful in the cyanate ester resin blend are any of these classes of esters that are known in the art. Examples of the bisphenol-based cyanate esters include commercially available monomers such as Primaset® BADCy and Primaset® LeCy manufactured by Lonza Inc., which are cyanate ester monomers derived from bisphenol A and E, respectively. Examples of the novolac-based cyanate esters include commercially available monomers such as Primaset® PT-15 and Primaset® PT-30 manufactured by Lonza Inc., which are mixtures of cyanate ester isomers derived from oligomeric phenolic resins (novolacs). Among the above-mentioned flexible cyanate esters, one or more monomers similar to Primaset® LeCy, PT-15, and PT-30 is preferred.

The cyanate ester resin blend may be formulated by blending the resveratrol-based cyanate ester and the flexible cyanate ester having a configuration different than that of the resveratrol-based cyanate ester until a homogeneous mixture results. Blending can be performed at room temperature up to the melting point of the flexible cyanate ester, using techniques known in the art. Preferably, the blending is conducted at the lowest possible temperature to reduce or eliminate cross-linking reactions. When formulating the cyanate ester resin blend, the mass ratio of the resveratrol-based cyanate ester to the flexible cyanate ester is from 80:20 to 20:80, more preferably 80:20 to 40:60. For most cyanate ester resin blends, at least 20% by mass of the flexible cyanate ester in the cyanate ester resin blend is required to slow down, or eliminate the crystallization of the resveratrol-based cyanate ester, allowing for the material to be processed as a liquid, or a solid that melts at 70° C. or less, at room temperature. In general, a minimum of 40% by mass of the resveratrol-based cyanate ester is required in the cyanate ester resin blend to impart enhanced thermal properties (e.g., thermal stability, char yield, and $T_g$) comparable to those achieved with a pure resveratrol-based cyanate ester.

The cyanate ester resin blend can include optional additives commonly known in the art. Examples of additives include catalysts, rheology modifiers, thermoplastics, fillers (e.g., fused silica), and fire retardants. Preferably, the additive is a catalyst which can be added during the formulation of the cyanate ester resin blend. Suitable catalysts include phenols, transition metal catalysts, and resins that contain phenolic functional groups.

The cyanate ester resin blend described above is useful in forming a composite product. The composite product includes the cyanate ester resin blend and a support material. A suitable support material is composed of one or more selected from carbon fiber, glass fiber, quartz fiber, silicon carbide fiber, boron nitride fiber, carbon nanotubes, boron nitride nanomaterials, or combinations thereof. The support material may be in the form of a fabric, a continuous fiber tow, a tape, or chopped fibers. By "chopped fibers" herein, it is meant that the fibers typically have lengths of about ⅛ inch up to about 2 inches. Examples of the composite product include a pre-preg article and a bulk molding compound.

The method of making the composite product includes combining the cyanate ester resin blend with a support material, and curing the combination at temperatures ranging from about 100° C. up to 240° C. Additionally, the composite product can undergo a post-cure at temperatures ranging from about 240° C. up to about 300° C.

When making a composite product that is a pre-preg article, a catalyst such as that described above may be added to the cyanate ester resin blend. A fabric, a continuous fiber tow, or a tape is provided as the support material, which is then impregnated with the cyanate ester resin blend using methods known in the art. The impregnated support material is then partially cured to form the pre-preg article.

Alternatively, when making a composite product that is a bulk molding compound, chopped fibers are provided as a support material. The chopped fibers am mixed with the cyanate ester resin blend using methods known in the art to form the bulk molding compound.

Examples

The following examples are given as particular embodiments of the invention and to demonstrate the practice and advantages thereof. It is to be understood that the examples are given by way of illustration and are not intended to limit the specification or the claims that follow in any manner.

Preparation of Cyanate Ester Resin Blend Samples

Primaset® LeCy monomers, and Primaset® PT-15 and PT-30 oligomers, were obtained from Lonza Inc. and used as received. The cis-ResCy monomer was synthesized from biosynthetic resveratrol manufactured by Evolva Inc. using the process described in U.S. Pat. No. 10,723,834. The process involved UV irradiation of trans-resveratrol to form cis-resveratrol, followed by cyanation to form the tris(cyanate) ester monomer cis-ResCy.

Blends of LeCy, PT-15, and PT-30 with cis-ResCy were formulated to create cyanate ester blend samples. The blend samples were prepared by adding the appropriate amount of each monomer and/or oligomer to an oven-dried vial equipped with a magnetic stirring bar, heating to 110° C. under an $N_2$ atmosphere, and mixing upon melting. Samples were formed from the cyanate esters at the mass ratios shown in Table 1.

TABLE 1

| Example | Monomer/Oligomer | Mix Ratio (Monomer/Oligomer: cis-ResCy)$^a$ |
|---|---|---|
| 1 | LeCy | 100:0 |
| 1A | LeCy | 80:20 |
| 1B | LeCy | 60:40 |
| 1G | LeCy | 40:60 |
| 1D | LeCy | 20:80 |
| 2 | PT-15 | 100:0 |
| 2A | PT-15 | 80:20 |
| 2B | PT-15 | 60:40 |
| 2C | PT-15 | 40:60 |
| 2D | PT-15 | 20:80 |
| 3 | PT-30 | 100:0 |
| 3A | PT-30 | 80:20 |
| 3B | PT-30 | 60:40 |
| 3C | PT-30 | 40:60 |
| 3D | PT-30 | 20:80 |
| 4 | cis-ResCy | — |

To form network structures, the samples were initially heated and degassed at 110° C. In the liquid state, the samples were mixed thoroughly to ensure homogeneity, and the solution was then poured into aluminum weigh dishes and molds. Next, the samples were placed in a curing oven, degassed for 30 minutes at 110° C., thermally cross-linked by curing under $N_2$ for 2 hours at 150° C. and 24 hours at 210° C., and then post-cured at 270° C.

For characterization of cyanate ester resin blends, 0.35 mL aluminum weigh dishes were used for the fabrication of samples for differential scanning calorimetry, thermogravimetric analysis, and moisture uptake. For thermomechanical analysis, cured bars of the samples were prepared using aluminum molds ($20 \times 2 \times 2$ mm$^3$) stamped from heavy-duty aluminum foil pressed into silicone molds.

Characterization of Cyanate Ester Resin Blends

All differential scanning calorimetry (DSC) studies were performed on a TA Instruments Q200 differential scanning calorimeter. Samples (5 to 10 mg) were contained in hermetically sealed, aluminum pans under a stream of $N_2$ gas with a flow rate of 50 mL/min. High purity indium was used to calibrate the calorimeter. The samples were heated at a rate of 10° C./min from 0 to 400° C. These DSC studies were used to evaluate the cure chemistry of the cyanate esters, and the degree of cure in the final networks. The monomers, oligomers, and blends were also scanned from −80 to 200°

C. to measure the pre-cure $T_g$s and melting points of the samples. The low temperature characterizations were conducted directly after melting and mixing of the monomers, as well as after recrystallization at room temperature.

All thermogravimetric analysis (TGA) studies were performed on a TA Instruments Q5000 thermogravimetric analyzer in standard, aluminum pans under $N_2$ or air atmospheres. Sample sizes were between 5 to 10 mg, and the samples were heated from 50 to 600° C. at 10° C./min. The TGA studies were used to determine the decomposition temperature ($T_d$) of the cured samples, which are reported as the average temperature at which 5/weight loss was observed from three separate runs. The TGA studies also provided the char yields of the samples at temperatures up to 600° C.

All dynamic-mode thermomechanical analysis (TMA) was performed using a TA Instruments Q400-0537 analyzer under 100 mL/min $N_2$. The bars were placed in contact with a flexural probe under a force of 0.20 N. Samples were cooled to 0° C., and then heated at 5° C./min to 400° C. The force was modulated ±0.08 N at a frequency of 0.10 Hz during the cycle. The TMA studies were used to determine the $T_g$s of the cyanate ester networks and are reported as the average loss peak from three separate runs. The associated error is the standard deviation derived from those values.

Moisture uptake analysis was performed using samples consisting of 200 to 500 mg pucks. The dry pucks were weighed on a Mettler AE-160 analytical balance, which has a sensitivity of ±0.1 mg. Three samples were tested concurrently in three separate 250 mL round-bottomed flasks. Deionized water (100 mL) was added to each flask and the contents were heated to reflux for four days. The samples were then blotted dry and the wet mass was obtained. Moisture uptake was calculated as follows:

$$\text{Moisture Uptake} = \frac{\text{Wet Mass} - \text{Dry Mass}}{\text{Dry Mass}} \times 100\%$$

The reported values were obtained by averaging the results from three samples. The associated error is the standard deviation derived from those values.

All density measurements were obtained on a Micrometrics Accupyc 1330 gas pycnometer using helium gas. The instrument was calibrated using a 0.718527 $cm^3$ metal ball bearing standard. Samples used for density measurements were pucks prepared in the same manner as the water immersion testing samples. The samples were weighed to ±0.1 mg, and two samples of each cyanate ester network were tested to ensure sample consistency. Ten measurements were obtained for each sample.

Evaluation of Cyanate Ester Resin Blends

Pure LeCy, PT-15, PT-30, and cis-ResCy, as well as blends of the cyanate esters, were analyzed by DSC to study low temperature transitions and cure chemistry.

The DSC scans for pure LeCy, PT-15, PT-30, and cis-ResCy are shown in FIG. 1, and the data are summarized in Table 2. The pure cyanate esters all had melting points at or below 100° C. The comparative Examples 1, 2, and 3, each composed of pure LeCy, PT-15, and PT-30 respectively, exhibited similar cure behavior based on the onset of cure, which began at approximately 225° C. for all three commercial resins. However, slight differences in the peak exotherm temperatures were observed. LeCy had the highest peak exotherm temperature (307° C.) whereas PT-15 and PT-30 had slightly lower peak exotherm temperatures of 286° C. and 295° C., respectively. The comparative Example 4, composed of pure cis-ResCy, showed a cure chemistry with significant differences compared to that of the commercial resins. cis-ResCy had an onset of cure that was approximately 50° C. lower than the commercial resins. The DSC scan showed a small exotherm that peaked at approximately 200° C., prior to the large cure exotherm that peaked at 274° C.

Figure 2:
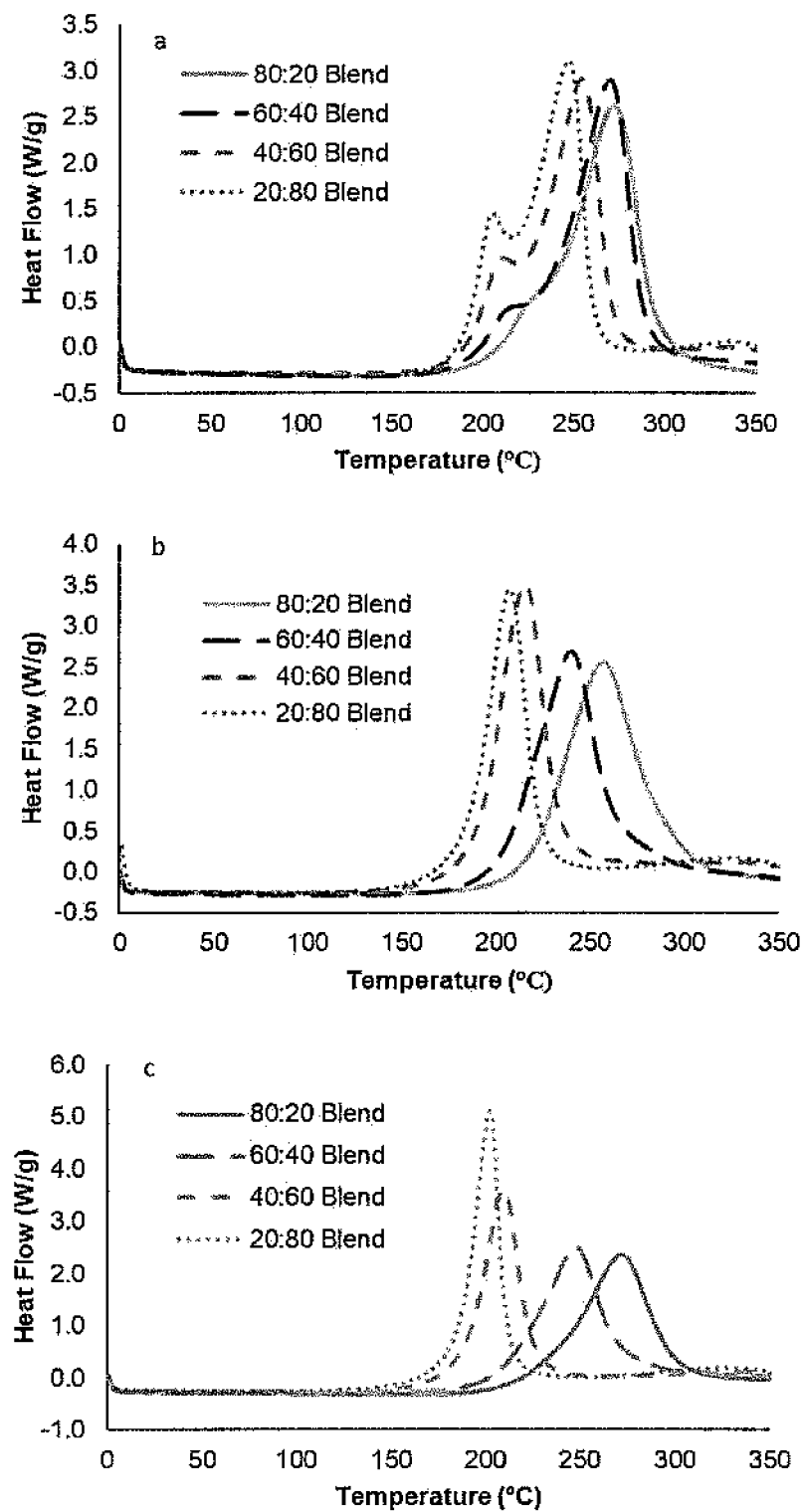
FIG. 2 is a graph showing differential scanning calorimetry (DSC) data for the cyanate ester resin blends according to embodiments of the invention: a) LeCy:cis-ResCy blends, b) PT-15:cis-ResCy blends, and c) PT-30:cis-ResCy blends.

The DSC scans for Examples 1A-1D, 2A-2D, and 3A-3D, which are composed of the blends with cis-ResCy, showed a decrease in the onset of cure temperature with increased loading of cis-ResCy and a corresponding decrease in the maximum exotherm temperature as shown in FIG. 2 and Table 2. All of the blends exhibited onsets of cure below 200° C., and the maximum exotherm temperatures were lower than 274° C., which was the maximum exotherm temperature for pure cis-ResCy. Considering cis-ResCy had the lowest onset of cure and peak exotherm temperatures of the cyanate esters, a decrease in cure onset temperature was expected for the blends. However, it was surprising that blending with cis-ResCy depressed the onset of cure to temperatures below that of pure cis-ResCy.

TABLE 2

| Example | Monomer/ Oligomer | Mix Ratio (Monomer/Oligomer: ResCy)[a] | Uncured $T_g$ (° C.) | $T_m$ (° C.)[b] | Exotherm Max (° C.) | $\Delta H_{cure}$ (J/g) | $\Delta H_{cure}$ (kJ/–OCN) |
|---|---|---|---|---|---|---|---|
| 1 | LeCy | 100:0 | −39 ± 1 | 31 ± 1 | 307 ± 4 | 780 ± 37 | 103 ± 5 |
| 1A | LeCy | 80:20 | −48 ± 1 | N/A | 270 ± 10 | 868 ± 48 | 108 ± 6 |
| 1B | LeCy | 60:40 | −48 ± 1 | 33 ± 1 | 265 ± 5 | 875 ± 4 | 103 ± 1 |
| 1C | LeCy | 40:60 | −44 ± 1 | 33 ± 1 | 254 ± 1 | 879 ± 23 | 98 ± 3 |
| 1D | LeCy | 20:80 | −41 ± 1 | 51 ± 5 | 248 ± 1 | 872 ± 21 | 93 ± 2 |
| 2 | PT-15 | 100:0 | −19 ± 1 | 25-100[c] | 286 ± 12 | 842 ± 21 | 106 ± 3 |
| 2A | PT-15 | 80:20 | −31 ± 1 | N/A | 258 ± 1 | 821 ± 1 | 98 ± 1 |
| 2B | PT-15 | 60:40 | −27 ± 1 | N/A | 240 ± 1 | 800 ± 14 | 92 ± 2 |
| 2C | PT-15 | 40:60 | −19 ± 1 | N/A | 216 ± 1 | 786 ± 20 | 86 ± 2 |
| 2D | PT-15 | 20:80 | −13 ± 1 | N/A | 207 ± 1 | 716 ± 9 | 75 ± 1 |
| 3 | PT-30 | 100:0 | −8 ± 1 | N/A | 295 ± 2 | 672 ± 10 | 86 ± 1 |
| 3A | PT-30 | 80:20 | −16 ± 1 | N/A | 270 ± 5 | 744 ± 3 | 90 ± 1 |
| 3B | PT-30 | 60:40 | −21 ± 1 | N/A | 248 ± 1 | 732 ± 11 | 85 ± 1 |
| 3C | PT-30 | 40:60 | −9 ± 1 | N/A | 209 ± 1 | 690 ± 19 | 76 ± 2 |
| 3D | PT-30 | 20:80 | −7 ± 1 | N/A | 202 ± 1 | 705 ± 18 | 74 ± 2 |
| 4 | cis-ResCy | — | N/A | 76 ± 1 | 274 ± 2 | 728 ± 22 | 74 ± 2 |

[a]The mass ratio of monomer and cis-ResCy in the blend.
[b]The melting point was taken on blends that recrystallized after heating and mixing.
[c]PT-15 exhibited three small endothermic peaks due to the mixture of oligomeric isomers.

Blending cis-ResCy with the commercial resins improved the degree of cure for the blends based on the enthalpy values determined under scanning DSC conditions. The enthalpies of cure for the blends were typically higher than the values expected from the rule of mixtures, especially for the LeCy:cis-ResCy blends. For example, as shown in Table 2, the 40:60 and 20:80 LeCy:cis-ResCy blends of Examples 1C and 1D had lower curing enthalpies of 98 and 93 kJ/(mol —OCN), but these values were still 14% and 16% higher than the values expected from the rule of mixtures for the 40:60 blend [86 kJ/(mol —OCN)] and 20:80 blend [80 kJ/(mol —OCN)], respectively. Further, even though PT-30 oligomers are less mobile than LeCy and PT-15, as evidenced by the PT-30 cure enthalpy shown in Example 3 of Table 2, higher degrees of cure of both the PT-30 and cis-ResCy components can be obtained in blends of the two as shown by the cure enthalpies for Examples 3A-3C.

The binary cis-ResCy blends exhibited excellent miscibility, and most of the blends remained liquid after the blending step. Recrystallization only occurred for the LeCy:cis-ResCy blends with >40% cis-ResCy loading, and typically required a few weeks before solidification was observed. Overall, the decreased melting points of the blends improve the processability of the resins at room temperature, which is desirable for composite fabrication.

Figure 3:
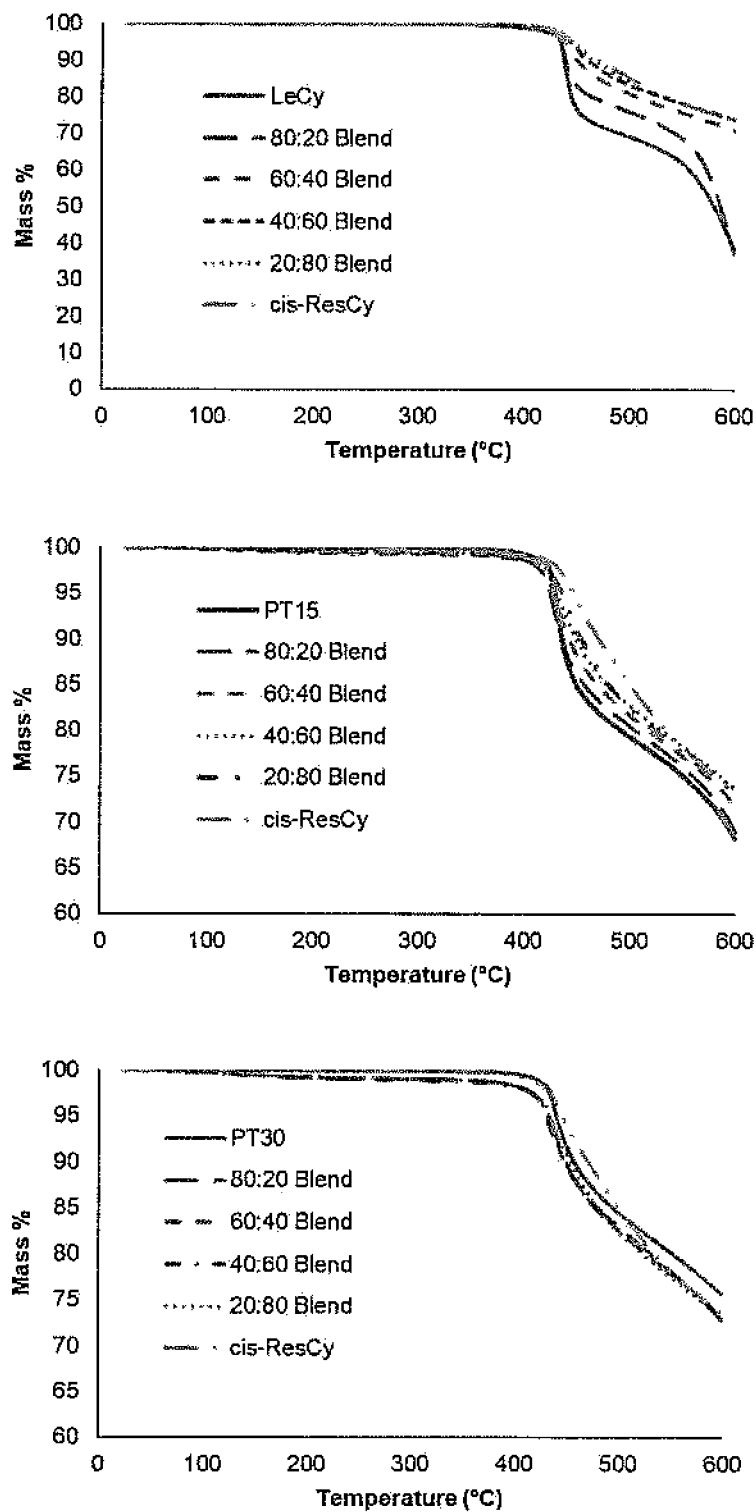
FIG. 3 is a graph showing thermogravimetric analysis (TGA) data of cyanate ester blends according to embodiments of the invention: a) LeCy:cis-ResCy blends, b) PT-15:cis-ResCy blends, and c) PT-30:cis-ResCy blends.

Oven-cured samples prepared from the pure cyanate esters and blends thereof were analyzed by TGA under nitrogen and air to determine the decomposition temperature and char yield of each material. These results are summarized in Table 3. The TGA scans of the networks in air are shown in FIG. 3. All of the samples exhibited excellent thermal stability with decomposition temperatures greater than 400° C. in both nitrogen and air.

All of the cyanate ester resin blends showed retention of the high thermal stability of their components. For Examples 1A-1D of cured LeCy:cis-ResCy blends, and Examples 2A-2D of cured PT-15:cis-ResCy blends, the char yields increased with increasing cis-ResCy content. As shown in Table 3, cured LeCy:cis-ResCy blend samples with 40% or greater cis-ResCy content have significantly improved thermal stability with up to 75% improvement in char formation. This trend was also observed for the cured PT-15:cis-ResCy blend samples, but the impact was reduced because pure PT-15 has a much higher char yield, 68.2% in air, than that of pure LeCy (39.8% in air).

TABLE 3

| Example | Monomer/ Oligomer | Mix Ratio (Monomer/Oligomer: ResCy) | $T_d$, $N_2$ (° C.) | Char Yield, $N_2$ (%) | $T_d$, Air (° C.) | Char Yield, Air (%) |
|---|---|---|---|---|---|---|
| 1 | LeCy | 100:0 | 435 ± 1 | 57.1 ± 0.4 | 434 ± 1 | 39.8 ± 1.9 |
| 1A | LeCy | 80:20 | 435 ± 1 | 63.3 ± 0.2 | 433 ± 1 | 43.6 ± 1.2 |
| 1B | LeCy | 60:40 | 440 ± 1 | 70.4 ± 0.3 | 437 ± 1 | 70.3 ± 0.6 |
| 1C | LeCy | 40:60 | 444 ± 1 | 73.9 ± 0.1 | 441 ± 1 | 73.2 ± 0.6 |
| 1D | LeCy | 20:80 | 446 ± 1 | 75.1 ± 0.2 | 444 ± 1 | 73.7 ± 0.2 |
| 2 | PT-15 | 100:0 | 429 ± 1 | 69.6 ± 0.1 | 429 ± 1 | 68.2 ± 0.3 |
| 2A | PT-15 | 80:20 | 425 ± 2 | 70.6 ± 0.3 | 423 ± 2 | 69.8 ± 0.8 |
| 2B | PT-15 | 60:40 | 429 ± 2 | 73.0 ± 0.1 | 427 ± 2 | 71.9 ± 0.1 |
| 2C | PT-15 | 40:60 | 433 ± 1 | 74.5 ± 0.3 | 431 ± 1 | 73.1 ± 0.7 |
| 2D | PT-15 | 20:80 | 437 ± 1 | 74.6 ± 0.1 | 435 ± 2 | 72.8 ± 0.7 |
| 3 | PT-30 | 100:0 | 442 ± 1 | 75.6 ± 0.2 | 440 ± 1 | 75.4 ± 0.6 |
| 3A | PT-30 | 80:20 | 433 ± 2 | 73.8 ± 0.1 | 433 ± 1 | 72.7 ± 0.1 |
| 3B | PT-30 | 60:40 | 433 ± 2 | 74.1 ± 0.1 | 432 ± 1 | 72.6 ± 0.2 |
| 3C | PT-30 | 40:60 | 432 ± 3 | 74.3 ± 0.2 | 430 ± 1 | 72.7 ± 0.9 |
| 3D | PT-30 | 20:80 | 435 ± 3 | 74.3 ± 0.5 | 434 ± 1 | 72.7 ± 0.7 |
| 4 | cis-ResCy | — | 449 ± 1 | 75.4 ± 0.2 | 446 ± 1 | 73.5 ± 0.3 |

The cured samples were analyzed by TMA to determine $T_g$s, while the moisture uptakes were determined by exposing samples to boiling water for 96 hours. The hydrolytic stability of the wet samples was then evaluated by comparison of the dry $T_g$s to the wet $T_g$s, allowing for a determination of the "wet $T_g$ knockdown" that occurs due to plasticization and hydrolysis of the cured samples by water. These results are summarized in Table 4.

TABLE 4

| Example | Monomer/ Oligomer | Mix Ratio (Monomer/Oligomer: ResCy)[a] | Density (g/mL) | Moisture Uptake (wt %) | $T_g$ (° C.)[b] | Wet $T_g$ (° C.)[b] |
|---|---|---|---|---|---|---|
| 1 | LeCy | 100:0 | 1.263 ± 0.001 | 2.77 ± 0.20 | 264 ± 1 | 190 ± 1 |
| 1A | LeCy | 80:20 | 1.2729 ± 0.0009 | 4.23 ± 0.43 | 281 ± 7 | 157 ± 3 |
| 1B | LeCy | 60:40 | 1.3124 ± 0.0010 | 5.10 ± 0.28 | 369 ± 2[c] | 149 ± 6 |
| 1C | LeCy | 40:60 | 1.3323 ± 0.0021 | 7.38 ± 0.16 | 390 ± 4[c] | 106 ± 1 |
| 1D | LeCy | 20:80 | 1.3633 ± 0.0011 | 8.76 ± 0.18 | 391 ± 1[c] | 101 ± 2 |
| 2 | PT-15 | 100:0 | 1.293 ± 0.001 | 3.88 ± 0.11 | 272 ± 4 | 167 ± 5 |
| 2A | PT-15 | 80:20 | 1.3011 ± 0.0008 | 5.18 ± 0.09 | 272 ± 7 | 158 ± 3 |
| 2B | PT-15 | 60:40 | 1.3154 ± 0.0004 | 6.13 ± 0.16 | 366 ± 9[c] | 138 ± 8 |
| 2C | PT-15 | 40:60 | 1.3269 ± 0.0004 | 8.28 ± 0.21 | 372 ± 8[c] | 104 ± 1 |
| 2D | PT-15 | 20:80 | 1.3424 ± 0.0007 | 9.68 ± 0.34 | 386 ± 2[c] | 106 ± 9 |
| 3 | PT-30 | 100:0 | 1.288 ± 0.001 | 6.52 ± 0.05 | 373 ± 1[c] | 160 ± 3 |

TABLE 4-continued

| Example | Monomer/ Oligomer | Mix Ratio (Monomer/Oligomer: ResCy)[a] | Density (g/mL) | Moisture Uptake (wt %) | $T_g$ (° C.)[b] | Wet $T_g$ (° C.)[b] |
|---|---|---|---|---|---|---|
| 3A | PT-30 | 80:20 | 1.2956 ± 0.0006 | 7.63 ± 0.28 | 384 ± 5[c] | 155 ± 7 |
| 3B | PT-30 | 60:40 | 1.3085 ± 0.0011 | 8.49 ± 0.27 | 380 ± 6[c] | 103 ± 2 |
| 3C | PT-30 | 40:60 | 1.3201 ± 0.0004 | 10.53 ± 0.10 | 376 ± 5[c] | 101 ± 3 |
| 3D | PT-30 | 20:80 | 1.3268 ± 0.0016 | 12.33 ± 0.34 | 388 ± 4[c] | 101 ± 5 |
| 4 | cis-ResCy | — | 1.368 ± 0.001 | 12.35 ± 0.69 | >400[c] | 76 ± 14 |

[a]The mass ratio of monomer and cis-ResCy in the blend.
[b]Reported as the drop in stiffness (storage) in dynamic-mode TMA.
[c]In-situ cure was observed due to an increase in stiffness (storage) at high temperatures. The reported $T_g$ represents the $T_g$ after in-situ cure and does not represent the "as-cured" $T_g$.

As-cured $T_g$s could only be determined for the PT-15:cis-ResCy samples (Examples 2A-2D) and the 80:20 LeCy:cis-ResCy sample (Example 1A) due to in-situ cure occurring before the $T_g$ was observed in the other blend samples. However, all of the blend samples did exhibit $T_g$s after in-situ cure, and these values are likely representative of the fully cured $T_g$. Most notably, for Examples 1B and 2B of cured LeCy:cis-Rescy and PT-15:cis-ResCy blend samples with 40% cis-ResCy content, the $T_g$ increased 105° C. and 94° C. compared to the respective cured pure cyanate ester samples. And so, significant improvements in $T_g$ were obtained in the cured binary cyanate ester blend samples at modest cis-ResCy loading.

Figure 4:
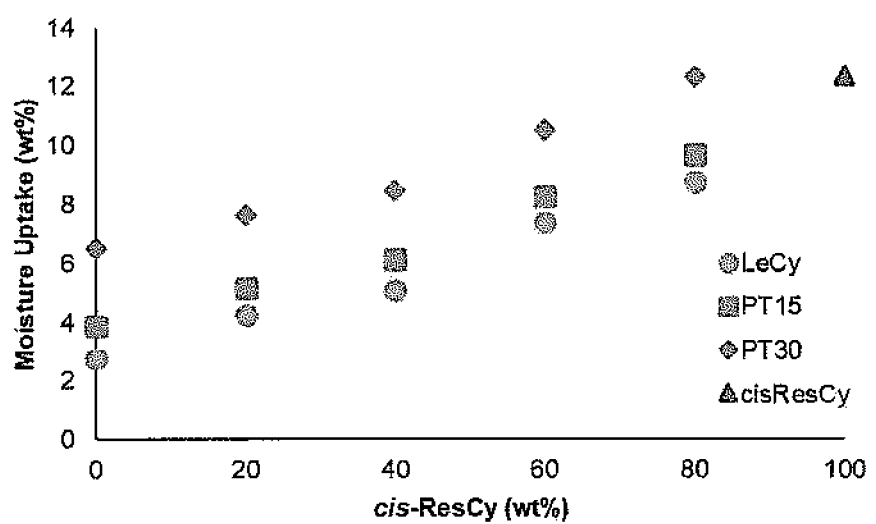
FIG. 4 is a graph showing moisture uptake versus cis-ResCy content for cyanate ester resin blends prepared with LeCy, PT-15, and PT-30 according to embodiments of the invention.

The water immersion studies showed that the moisture uptake of cured cis-ResCy was significantly decreased by blending with the commercial resins. This trend is observed clearly in FIG. 4, which shows a nearly linear relationship between moisture uptake and cis-ResCy content in all three blend types. The densities of cured blend samples also increased with increasing cis-ResCy content. In addition, the decrease in water uptake was mirrored by an improvement in the wet $T_g$ of the cured blend samples with moderate to high loadings of the commercial resins.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

The invention claimed is:

1. A high performance cyanate ester resin blend comprising:
    a resveratrol-based cyanate ester; and
    a flexible cyanate ester having a configuration different than that of the resveratrol-based cyanate ester, wherein
        the resveratrol-based cyanate ester is at least 20% and no more than 80% of the total mass of cyanate esters in the cyanate ester resin blend, and
        at room temperature, the cyanate ester resin blend is a liquid or a solid that melts at less than 70° C.

2. The high performance cyanate ester resin blend of claim 1, wherein the resveratrol-based cyanate ester is at least one of trans-resveratrol tricyanate, cis-resveratrol tricyanate, and dihydroresveratrol tricyanate.

3. The high performance cyanate ester resin blend of claim 2, wherein the resveratrol-based cyanate ester is cis-resveratrol tricyanate.

4. The high performance cyanate ester resin blend of claim 1, wherein the flexible cyanate ester having a configuration different than that of the resveratrol-based cyanate ester is selected from a bisphenol-based cyanate ester, a novolac-based cyanate ester, or a combination thereof.

5. The high performance cyanate ester resin blend of claim 4, wherein the bisphenol-based cyanate ester is at least one of a cyanate ester derived from bisphenol A and a cyanate ester derived from bisphenol E.

6. The high performance cyanate ester resin blend of claim 4, wherein the novolac-based cyanate ester is a mixture of cyanate esterisomers derived from oligomeric phenolic resins synthesized from novolacs.

7. The high performance cyanate ester resin blend of claim 1, wherein the resveratrol-based cyanate ester is at least 40% of the total mass of the cyanate esters in the cyanate ester resin blend.

8. The high performance cyanate ester resin blend of claim 1, wherein the cure onset temperature of the cyanate ester resin blend is below the cure onset temperature of the resveratrol-based cyanate ester.

9. A composite product comprising:
    the cyanate ester resin blend of claim 1; and
    a support material.

10. The composite product of claim 9, wherein the support material is selected from carbon fiber, glass fiber, quartz fiber, silicon carbide fiber, boron nitride fiber, carbon nanotubes, boron nitride nanomaterials, and combinations thereof.

11. The composite structure of claim 9, wherein the support material is a fabric, a continuous fiber tow, a tape, or chopped fibers.

12. A method of making a composite product, the method comprising:
    providing a support material;
    combining the support material with the cyanate ester resin blend of claim 1; and
    curing the support material with the cyanate ester resin blend at a temperature ranging from about 100° C. to about 240° C.

13. The method of making a composite product of claim 12, wherein the combining of the support material with the resin blend comprises:
    providing a fabric, a continuous fiber tow, or a tape as the support material; and
    impregnating the support material with the cyanate ester resin blend.

14. The method of making a composite product of claim 13, further comprising partially curing the support material with the cyanate ester resin blend, thereby forming a prepreg article.

15. The method of making a composite product of claim 12, further comprising post-curing the support material with the resin blend at a temperature ranging from about 240° C. to about 300° C.

16. A method of making a composite product, the method comprising:
- providing chopped fibers as a support material; and
- mixing the chopped fibers with the cyanate ester resin blend of claim 1, thereby forming a bulk molding compound.

17. The high performance cyanate ester resin blend of claim 8, wherein the cure onset temperature of the cyanate ester resin blend decreases as the loading of the resveratrol-based cyanate ester increases.

18. The high performance cyanate ester resin blend of claim 1, wherein in the cyanate ester resin blend has an enthalpy of cure, $\Delta H_{cure}$(kJ/mol —OCN), higher than a theoretical value as determined by the rule of mixtures.

* * * * *